US009784402B2

United States Patent
Menzel et al.

(10) Patent No.: US 9,784,402 B2
(45) Date of Patent: Oct. 10, 2017

(54) METHOD FOR PRODUCING A THERMALLY INSULATING MIXTURE

(71) Applicants: Frank Menzel, Hanau (DE); Tobias Banert, Hanau (DE); Hubert Mueller, Frankfurt am Main (DE); Matthias Geisler, Grosskrotzenburg (DE); Thorsten Schultz, Hassenroth (DE)

(72) Inventors: Frank Menzel, Hanau (DE); Tobias Banert, Hanau (DE); Hubert Mueller, Frankfurt am Main (DE); Matthias Geisler, Grosskrotzenburg (DE); Thorsten Schultz, Hassenroth (DE)

(73) Assignee: EVONIK DEGUSSA GmbH, Essen (DE)

( * ) Notice: Subject to any disclaimer, the term of this patent is extended or adjusted under 35 U.S.C. 154(b) by 229 days.

(21) Appl. No.: 14/421,594

(22) PCT Filed: Oct. 15, 2013

(86) PCT No.: PCT/EP2013/071459
§ 371 (c)(1),
(2) Date: Feb. 13, 2015

(87) PCT Pub. No.: WO2014/063949
PCT Pub. Date: May 1, 2014

(65) Prior Publication Data
US 2015/0204477 A1 Jul. 23, 2015

(30) Foreign Application Priority Data

Oct. 26, 2012 (EP) ..................................... 12007388

(51) Int. Cl.
*B02C 23/24* (2006.01)
*F16L 59/02* (2006.01)
(Continued)

(52) U.S. Cl.
CPC ............ *F16L 59/028* (2013.01); *B02C 23/24* (2013.01); *C04B 20/026* (2013.01); *C04B 30/02* (2013.01); *B02C 2013/145* (2013.01)

(58) Field of Classification Search
CPC .. B02C 23/24; B02C 2013/145; F16L 59/028; C04B 20/026; C04B 30/02
See application file for complete search history.

(56) References Cited

U.S. PATENT DOCUMENTS 3,625,896 A 12/1971 Kirk et al.
5,911,903 A 6/1999 Eyhorn et al.
(Continued)

FOREIGN PATENT DOCUMENTS

DE         196 18 968    11/1997
DE    10 2007 020 716    11/2008
(Continued)

OTHER PUBLICATIONS

International Search Report Issued Jan. 24, 2014 in PCT/EP13/071459 filed Oct. 15, 2013.
(Continued)

*Primary Examiner* — Mark Rosenbaum
(74) *Attorney, Agent, or Firm* — Oblon, McClelland, Maier & Neustadt, L.L.P.

(57) ABSTRACT

A method for continuous production of a thermally insulating mixture comprising silica particles and opacifier particles, in which a premixed stream comprising a carrier gas, silica particles and opacifier particles is introduced into a fine impact mill, ground and mixed therein, after which the solid is separated from the gas stream, wherein the fine impact mill is an air-stream mill comprising grinding tracks arranged one above the other on a rotatable shaft.

12 Claims, 1 Drawing Sheet

(51) Int. Cl.
*C04B 30/02* (2006.01)
*C04B 20/02* (2006.01)
*B02C 13/14* (2006.01)

(56) References Cited

U.S. PATENT DOCUMENTS

| | | |
|---|---|---|
| 5,984,212 A | 11/1999 | Andreae-Jaeckering |
| 2002/0197464 A1 | 12/2002 | Kicherer et al. |
| 2007/0114308 A1 | 5/2007 | Andreae-Jackering |

FOREIGN PATENT DOCUMENTS

| | | |
|---|---|---|
| EP | 0 796 660 | 9/1997 |
| EP | 1 787 722 | 5/2007 |
| GB | 1 230 947 | 5/1971 |
| JP | 2-268840 A | 11/1990 |
| JP | 2000-15123 A | 1/2000 |
| JP | 2002-338335 | 11/2002 |
| JP | 2003-181324 A | 7/2003 |
| JP | 2007-130627 A | 5/2007 |
| JP | 2008-100188 A | 5/2008 |
| JP | 2011-219324 A | 11/2011 |

OTHER PUBLICATIONS

European Search Report issued Nov. 19, 2013 in European Patent Application No. 12007388.7 Filed Oct. 26, 2012.

Caps, R. et al., "Thermal Conductivity of Opacified Powder Filler Materials for Vacuum Insulations1", International Journal of Thermophysics, vol. 21, No. 2, pp. 445-452, XP055078905, Jan. 2000.

Fricke, J. et al., "Optimization of monolithic silica aerogel insulants", International Journal of Heat and Mass Transfer, vol. 35, No. 9, pp. 2305-2309, XP055078907, Sep. 1992.

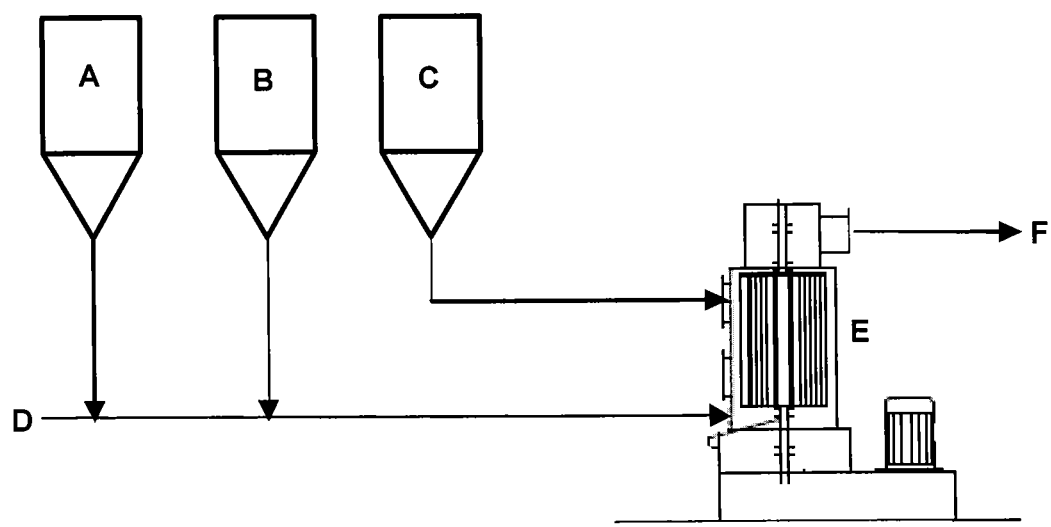

METHOD FOR PRODUCING A THERMALLY INSULATING MIXTURE

The invention relates to a continuous method for producing a thermally insulating mixture, as well as to the mixture itself and moldings produced therefrom.

Thermally insulating mixtures containing silica, opacifiers and fibers are known. For the production thereof, planetary mixers as disclosed in EP A 1988228 or dissolvers, planetary dissolvers, cyclone mixers, fluid mixers and classifier mills as disclosed in DE A 102010029513 are used, for example. The method is preferably performed in such a way that initially the silica is predispersed, then the total quantity of fibers is firstly premixed with some of the silica as a kind of masterbatch. Alternatively, the masterbatch may also contain the total quantity of IR opacifiers and fibers. After intensive dispersion, the predispersed silica is added and mixed in intensively.

It is documented in the prior art that, when producing thermally insulating mixtures, grinding and mixing of the ingredients is performed separately for reasons of better manageability, often using different units. This typically results in only low throughputs, combined with high handling complexity and high plant use. This in turn leads to high per-unit manufacturing costs, low productivity and high capital requirements.

The technical problem underlying the present invention was therefore that of providing a method for producing a thermally insulating mixture in which grinding and mixing of the ingredients proceed continuously and which allows high throughput.

A further technical problem was that of providing improved pulverulent mixtures for thermal insulation.

The present invention provides a method for the continuous production of a powdery thermally insulating mixture, which comprises or consists of silica particles, opacifier particles, in which method a premixed stream comprising a carrier gas, silica particles and opacifier particles is introduced into an fine impact mill, ground and mixed therein, after which the solid is separated from the gas stream, wherein the fine impact mill is an air-stream mill comprising grinding tracks arranged one above the other on a rotatable shaft.

The mode of operation of an air-stream mill, in which particles are picked up by a carrier gas stream, set in turbulent motion and ground by collision of the particles with one another and collision with the components of the mill, is known. The air-stream mill comprises a plurality of grinding stages with a common stator with a plurality of grinding tracks arranged one above the other as rotor.

An air-stream mill comprises a rotor rotating at high speed which is mounted fixedly on a shaft. The rotation generates eddies which lift up the particles to be ground and mixed. A subsequent classifier zone separates fine product from coarse product, and the coarse product is returned continuously to the lower grinding zone. The air-stream mill may be provided with a downstream filter cyclone, in which a classifier system may optionally be integrated, which separates the air from the product produced and discharges the resultant product from the filter for example via star wheel valves.

The phrase "premixed stream" is intended to mean that the particulate constituents of the stream are merely mixed, as far as possible homogeneously, and not ground or ground only to a minor degree. The resultant mixture does not have the good thermally insulating properties of the material which is produced according to the invention.

A preferred carrier gas is air. The carrier gas may be preheated, preferably to temperatures of 100° C. to 450° C., particularly preferably 150° C. to 300° C. Such an embodiment is particularly advantageous when production of the pulverulent mixture comprises further steps, such as a hydrophobization and/or press-molding to yield moldings. These subsequent steps may best be performed when the pulverulent mixture has only a low residual moisture content, as a rule of no more than 0.3 to 0.5 mass %, and a temperature of 100° C. or more, as a rule 120 to 150° C. The technical advantage of this embodiment resides in the fact that the components to be mixed are present in a maximally dispersed state, whereby drying is possible within a very short period.

In a preferred embodiment of the invention, the premixed stream is obtained by continuously producing, in each case via a carrier gas stream via in each case a metering unit, which for example comprises a metering screw and a rotary air lock, a mass flow containing silica particles and a mass flow containing opacifier particles, and bringing them together.

In the method according to the invention the peripheral speed of the air-stream mill may amount to up to 200 m/s. The suitable peripheral speed depends on the intended throughput and the ratio of the mixture component silica particles and opacifier particles. In general, high peripheral speeds lead to higher material wear of the mill, while excessively low peripheral speeds impair mixing quality. A peripheral speed range of 30 to 100 m/s is preferred, and a range of 50 to 80 m/s is particularly preferred.

The mean residence time of the mixture component silica particles and opacifier particles in the air-stream mill preferably amounts to less than 10 s. In general, low gas throughputs will be used, since a larger amount of gas entails greater technical complexity. Excessively low gas throughputs may result in solids sedimentation in the air-stream mill and thus in unstable operation. As in the case of the peripheral speed, the mean residence time will also depend on the intended throughput and the ratio of the mixture components silica particles and opacifier particles. A mean residence time of 0.05 to 5 s is particularly preferred, with one of 0.1 to 1 s being very particularly preferred.

The particulate fractions of silica and opacifier conveyed to the fine impact mill may be varied within broad limits. A fraction of silica particles of 30 to 95 wt. % and of opacifier particles of 5 to 70 wt. %, in each case relative to the sum of the particulate fractions, is preferred. A fraction of silica particles of 70 to 90 wt. % and of opacifiers of 10 to 30 wt. % is particularly preferred.

The loading of the carrier gas may likewise be varied within broad limits. It preferably amounts to 0.2 to 2 kg solids/Nm$^3$ carrier gas and particularly preferably 0.5 to 1.2 kg solids/Nm$^3$ carrier gas. The solids comprise or consist of silica particles and opacifier particles.

In a particular embodiment of the method according to the invention, fibers are introduced into the particle-containing stream. This preferably does not take place until the final quarter of the grinding zone or indeed outside the grinding zone, above the final grinding track, but still inside an air-stream mill. Here, there are no longer any rotating parts which subject the particles and fibers to high shear stress. The fibers are separated particularly gently thereby and mixed with the particles.

In the method according to the invention, the throughput of silica particles, opacifier particles and optionally fibers amounts in total preferably to at least 200 kg/h, particularly preferably 200 to 1500 kg/h and very particularly preferably 400 to 1000 kg/h.

Silica particles which may be considered are silicon dioxide aerogels, precipitated silicas and pyrogenically produced silicas. The best results are obtained with pyrogenically produced silicas.

Pyrogenic silicas are produced by flame hydrolysis of silicon compounds, such as for example chlorosilanes. In this method a hydrolyzable silicon halide is caused to react with a flame formed by combustion of hydrogen and an oxygen-containing gas. The combustion flame provides water for hydrolysis of the silicon halide and sufficient heat for the hydrolysis reaction. A silica produced in this way is known as pyrogenic silica. In this process, first of all primary particles are formed, which are virtually free of inner pores. These primary particles fuse during the process, forming aggregates linked by "sinter necks". Due to this structure, pyrogenically produced silica is an ideal thermally insulating material, since the aggregate structure brings about sufficient mechanical stability, minimizes heat transfer through solid conductivity via the "sinter necks" and produces sufficiently high porosity.

The surface of the silica may be modified by reaction with organosilanes. By way of example, $R_n$—Si—$X_{4-n}$, $R_3$Si—Y—$SiR_3$, $R_nSi_nO_n$, $(CH_3)_3$—Si—(O—$Si(CH_3)_2)_n$—OH, HO—$Si(CH_3)_2$—(O—$Si(CH_3)_2)_n$—OH, with n=1-8; R=—H, —$CH_3$, —$C_2H_5$; X=—Cl, —Br; —$OCH_3$, —$OC_2H_5$, —$OC_3H_8$, Y=NH, O may be mentioned. $(CH_3)_3$SiCl, $(CH_3)_2SiCl_2$, $CH_3SiCl_3$, $(CH_3)_3SiOC_2H_5$, $(CH_3)_2Si(OC_2H_5)_2$, $CH_3Si(OC_2H_5)_3$, $(CH_3)_3SiNHSi(CH_3)_3$, $(CH_3)_3SiOSi(CH_3)_3$, $(CH_3)_8Si_4O_4$ [octamethyltetracyclosiloxane], $(CH_3)_6Si_3O_3$ [hexamethyltricyclosiloxane] and $(CH_3)_3Si(OSi(CH_3)_2)_4OH$ [low molecular weight polysiloxanol] are explicitly mentioned.

In the method according to the invention, however, non-surface-modified silica particles yield the better results. In particular, pyrogenic silica particles with a BET surface area of 90 $m^2/g$ or more, particularly preferably of 150 to 500 $m^2/g$ are used.

The opacifier particles used in the method according to the invention preferably comprise titanium oxides, zirconium oxides, ilmenites, iron titanates, iron oxides, zirconium silicates, silicon carbides, manganese oxides, graphites and/or carbon blacks, or substance mixtures which comprise at least one of the above-stated constituents. Silicon carbide, titanium oxides, iron oxides or carbon blacks are particularly preferred. The particle size of the opacifiers is as a rule between 0.1 and 25 μm. In the case of silicon carbide and titanium oxides, the average particle diameter $d_{50}$ is preferably 1 to 10 μm, particularly preferably 2 to 8 μm. The fraction of opacifier particles in the complete mixture preferably amounts to 10 to 30 wt. %.

Fibers may additionally be used to provide mechanical reinforcement. These fibers may be of inorganic or organic origin and amount as a rule to 2 to 10 wt. %, relative to the sum of silicas and opacifiers. Examples of inorganic fibers which may be used are glass wool, rock wool, basalt fibers, slag wool and ceramic fibers which consist of melts of alumina and/or silicon dioxide and further inorganic metal oxides. Pure silicon dioxide fibers are for example silica fibers. Examples of organic fibers which may be used are cellulose fibers, textile fibers or plastics fibers. The diameter of the fibers preferably amounts to 1 to 30 μm, particularly preferably to 5 to 15 μm, very particularly preferably to 6 to 9 μm, and the length preferably amounts to 1 to 25 mm, particularly preferably to 3 to 12 mm.

FIG. 1 is a schematic diagram of a flow chart for performing the method according to the invention. Here, A=silica, B=opacifier, C=fibers, D=air, E=fine impact mill and F=filter.

The invention also provides a pulverulent mixture for thermal insulation obtainable by the method according to the invention.

The invention further provides a pulverulent mixture for thermal insulation which contains as powder constituents 70 to 90 wt. % pyrogenic silica, with a BET surface area of 150 to 500 $m^2/g$, preferably 200 to 400 $m^2/g$, 10 to 30 wt. % silicon carbide, and 2 to 10 wt. % fibers, in each case relative to the pulverulent mixture, in which at a temperature of 300K the normalized, effective, mass-specific total absorbance coefficient, defined as effective, mass-specific total absorbance coefficient divided by mass fraction of silicon carbide in the pulverulent mixture, amounts to at least 3.5 $m^2/kg$, preferably 3.5 to 4.5 $m^2/kg$, particularly preferably 3.8 to 4.3 $m^2/kg$.

The average particle diameter $d_{50}$ of the silicon carbide preferably amounts to 1 to 8 μm.

The invention further provides a pulverulent mixture for thermal insulation which contains as powder constituents 70 to 90 wt. % pyrogenic silica, with a BET surface area of 150 to 500 $m^2/g$, preferably 200 to 400 $m^2/g$, 10 to 30 wt. % carbon black, and 2 to 10 wt. % fibers, in each case relative to the pulverulent mixture, in which at a temperature of 300K the normalized, effective, mass-specific total absorbance coefficient, defined as effective, mass-specific total absorbance coefficient divided by mass fraction of carbon black in the pulverulent mixture, amounts to at least 9 $m^2/kg$, preferably 9 to 10 $m^2/kg$.

The fibers are those which have already been described in the application.

EXAMPLES

Ingredients
A: AEROSIL® 300, pyrogenic silica; Evonik Industries; BET surface area 300 $m^2/g$
B Lampblack 101, ORION Engineered Carbon; $d_{50}$=2.17 μm;
C Silicon carbide, Silcar G14; ESK; $d_{50}$=2.73 μm;
D: Glass fibers, average fiber diameter approx. 9 μm; length approx. 6 mm The average particle diameter $d_{50}$ is determined by means of laser diffraction using a HORIBA LA-950 measuring instrument.

Air-stream mill: Model LGM4 from HOSOKAWA ALPINE.

Example 1

AEROSIL® 300 and lampblack 101 are each air-aspirated into the air-stream mill. The ingredients are each fed volumetrically using a metering screw. A rotary air lock is used in each case as an air shut-off between metering screw and installation. The ingredients are metered in such a way so as to produce a mixture of 80 wt. % silica and 20 wt. % silicon carbide, in each case relative to 25 kg batch size. The peripheral speed of the air-stream mill amounts to approx. 80 $ms^{-1}$, and the mean residence time of the substance mixture to approx. 0.1 s. The throughput obtained is 394.7 kg/h. The amount of air introduced into the air-stream mill amounts to 350 $m^3/h$.

Examples 2 to 7 are performed in a similar manner. Table 1 shows ingredients and operating parameters.

Examples 8 to 10 are performed in a similar manner to example 1, except that glass fibers are additionally aspirated in the upper region of the air-stream mill via a feed station. Table 1 shows ingredients and operating parameters.

Example 11 (Comparison)

3 kg of the mixture obtained from test 6 are mixed with 150 g of glass fibers in the cone mixer for approx. 30 minutes. The fibers were found to suffer significant damage in the mixer.

Example 12 (Comparison)

In a Minox type FSM 300 HM/1MK ploughshare mixer, 4 kg of AEROSIL® 300 and 1 kg of lampblack 101 are mixed at full vane revolution frequency for in each case 3 min without cutter head and then for 3 min with cutter head at full rotational speed.

Example 13 (Comparison)

In a Minox type FSM 300 HM/1 MK ploughshare mixer, 4 kg of AEROSIL® 300 and 1 kg of silicon carbide are mixed at full vane revolution frequency for in each case 3 min without cutter head and then for 3 min with cutter head at full rotational speed.

Determination of Normalized, Effective, Mass-Specific Total Absorbance Coefficient $e_m^*$—Examples 1, 5, 12 and 13

The effective, mass-specific absorbance coefficient $e_m^*$ was determined using the measurement method described in Keller et al., High temperatures-high pressures, pages 297-314, 2010. Sample preparation is described therein in points 3.1., 3.2. and 3.2.2. The calculation of $e_m^*$ is mentioned in point 2.2. Here, $e_m^*$ corresponds to the reciprocal of $e^*$ (T) indicated in equation 18.

In the method according to Keller et al., the material according to the invention and the comparative material are investigated using a Bruker Fourier transform infrared (FTIR) spectrometer in the wavelength range from 1.4 μm to 35 μm.

The test samples were prepared using a Galai Instruments GALAI PD-10 Vacuum Dispersing System. The effective, mass-specific total absorbance coefficient is subsequently normalized by division by the mass fraction of the IR opacifier in the pulverulent mixture. This normalized, effective, mass-specific total absorbance coefficient at a temperature of 300K is shown in table 2 for selected examples.

TABLE 2

Normalized, effective, mass-specific total absorbance coefficient $e_m^*$ at 300 K.

| | Example | | | |
|---|---|---|---|---|
| | 1 | 5 | 12 | 13 |
| $e_m^*$ [m²/kg] | 9.5 | 3.7 | 8.7 | 3.4 |

The higher values for $e_m^*$ denote lower radiant thermal conductivity of the materials according to the invention of examples 1 and 5 relative to the prior art materials according to examples 12 and 13. In evacuated systems in particular, radiant thermal conductivity constitutes a significant proportion of total thermal conductivity.

TABLE 1

Ingredient quantities and operating parameters

| Example | A wt. % | B wt. % | C wt. % | D wt. % | Sum of A-D kg | Air m³/h | Peripheral speed m/s | Throughput kg/h | Solid/Carrier gas kg/Nm³ |
|---|---|---|---|---|---|---|---|---|---|
| 1 | 80 | 20 | — | — | 25.0 | 350 | 80 | 394.7 | 1.1 |
| 2 | 80 | 20 | — | — | 75.0 | 500 | 80 | 394.7 | 0.8 |
| 3 | 70 | 30 | — | — | 27.0 | 500 | 80 | 426.3 | 0.9 |
| 4 | 60 | 40 | — | — | 31.8 | 500 | 80 | 502.1 | 1.0 |
| 5 | 80 | — | 20 | — | 22.0 | 500 | 80 | 227.6 | 0.5 |
| 6 | 80 | — | 20 | — | 25.0 | 500 | 80 | 394.7 | 0.8 |
| 7 | 70 | — | 30 | — | 27.0 | 500 | 80 | 426.3 | 0.9 |
| 8 | 80 | 20 | — | 5 | 27.0 | 650 | 80 | 405.0 | 0.6 |
| 9 | 80 | — | 20 | 5 | 24.4 | 700 | 80 | 385.3 | 0.6 |
| 10 | 70 | — | 30 | 5 | 28.0 | 650 | 56 | 442.1 | 0.7 |

** at 20° C.

The invention claimed is:

1. A method for continuous production of a thermally insulating mixture comprising silica particles and opacifier particles,
   the method comprising
   introducing a premixed stream comprising a carrier gas, silica particles and opacifier particles into a fine impact mill, ground and mixed therein, and then
   separating solid from the gas stream,
   wherein the fine impact mill is an air-stream mill comprising grinding tracks arranged one above the other on a rotatable shaft.

2. The method as claimed in claim 1, wherein the peripheral speed of the air-stream mill amounts to up to 200 ms⁻¹.

3. The method as claimed in claim 1, wherein the mean residence time of the silica particles and opacifier particles in the air-stream mill amounts to less than 10 seconds.

4. The method as claimed in claim 1, wherein the carrier gas is preheated to 100° C. to 450° C.

5. The method as claimed in claim 1, wherein the premixed stream is obtained by bringing together silica particles and opacifier particles in each case into a carrier gas stream in each case via a metering unit.

6. The method as claimed in claim 1, wherein the particulate fractions of the mixture conveyed to the fine impact mill comprise 30 to 95 wt. % silica particles and 5 to 70 wt. % particulate opacifier, relative to the total of the particulate fractions.

7. The method as claimed in claim 1, wherein loading of the carrier gas amounts to 0.2 to 2 kg solids/$Nm^3$ carrier gas.

8. The method as claimed in claim 1, wherein fibers are introduced into the particle-containing stream above the final grinding track, but still inside an air-stream mill.

9. The method as claimed in claim 8, wherein the fibers are selected from the group consisting of glass wool, rock wool, ceramic fibers, silicon dioxide fibers, cellulose fibers, textile fibers and plastics fibers.

10. The method as claimed in claim 1, wherein a throughput of silica particles, opacifier particles and optionally fibers amounts in total to at least 200 kg/h.

11. The method as claimed in claim 1, wherein pyrogenically produced silica particles are employed.

12. The method as claimed in claim 1, wherein the opacifier particles are selected from the group consisting of carbon blacks, titanium oxides, silicon carbides, zirconium oxides, ilmenites, iron titanates, iron oxides, zirconium silicates, and manganese oxides.

* * * * *